June 22, 1965
G. S. DUKE
3,190,082
APPARATUS FOR MANUFACTURING SOFT ICE CREAM
Filed Oct. 4, 1962
2 Sheets-Sheet 2
FIG. 5.
FIG. 6.
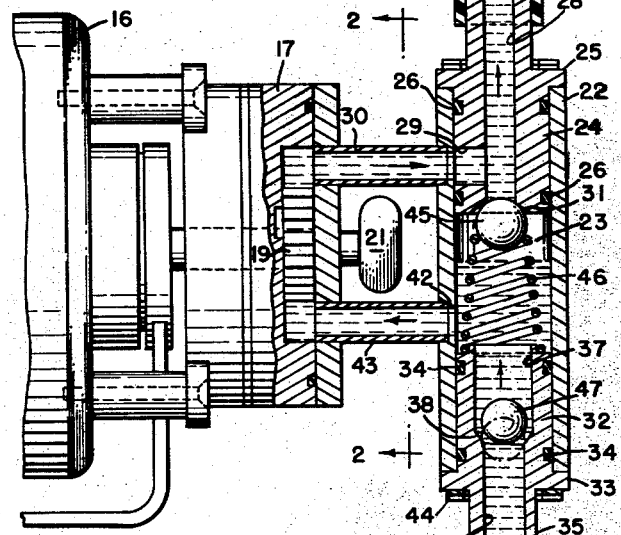
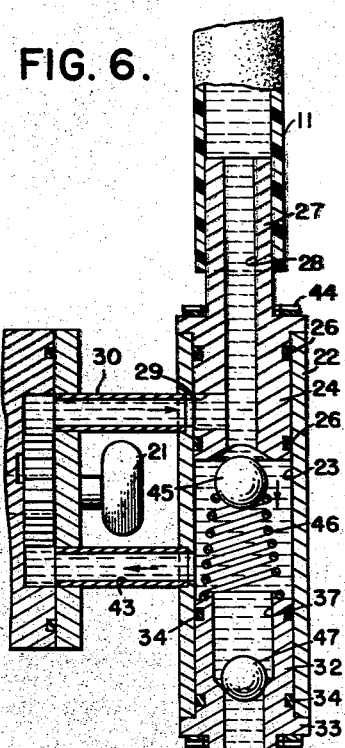
FIG. 7.
FIG. 8.
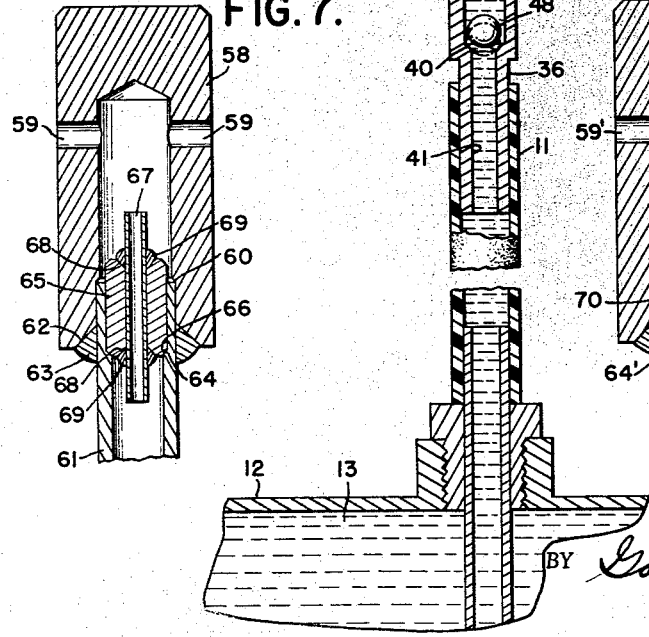
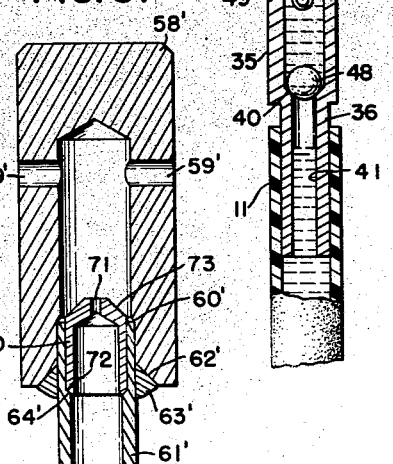
INVENTOR
GENE S. DUKE
BY *Garvey & Garvey*
ATTORNEYS

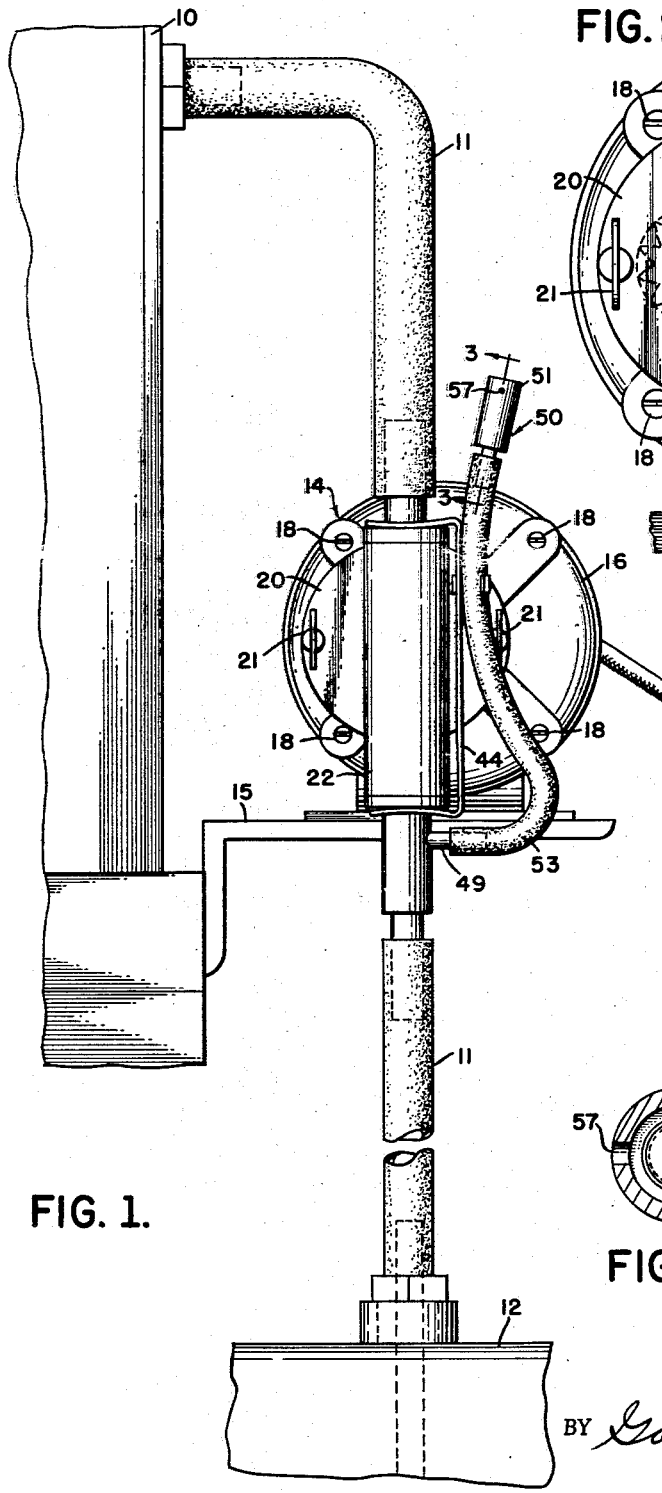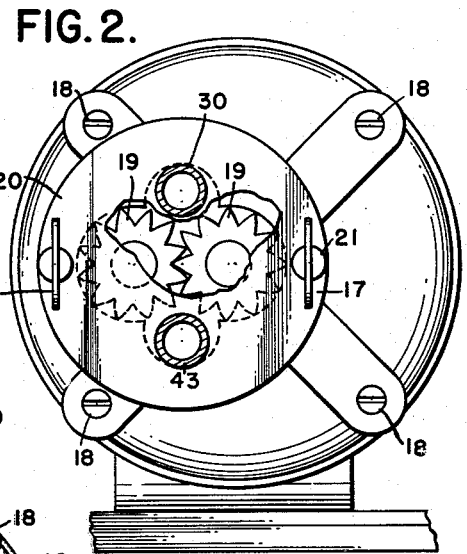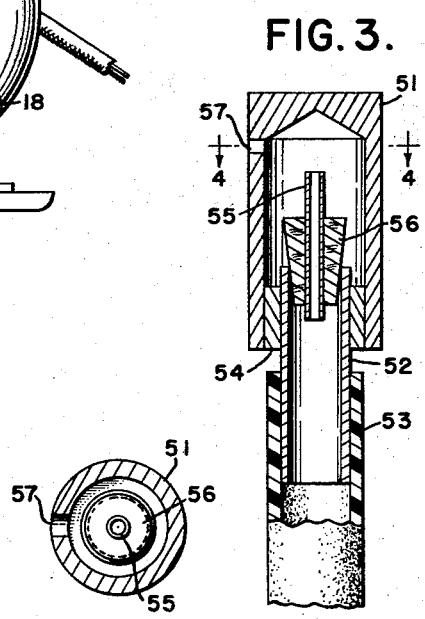

United States Patent Office 3,190,082
Patented June 22, 1965

---

3,190,082
APPARATUS FOR MANUFACTURING
SOFT ICE CREAM
Gene S. Duke, 617–623 15th Ave., East Moline, Ill.
Filed Oct. 4, 1962, Ser. No. 228,391
4 Claims. (Cl. 62—342)

This invention relates to apparatus for manufacturing soft ice cream, and more particularly to apparatus which dispenses ice cream intermittently, as needed.

The present invention is an improvement on Patent No. 2,981,075 for Apparatus and Method for Manufacturing Soft Ice Cream, of which I am co-inventor, and in which patented apparatus control of overrun is effected by use of strategically positioned ball valves and by adjustment of a pump by-pass and an air needle valve. While the assembly of that invention represents a valuable advance in the art, the adjustment features necessitate a number of extra parts, requires skilled personnel to operate, and results in a product, the overrun of which may vary considerably from one machine to the next. The term overrun, as herein used, is defined as either the increase in volume of frozen mix over a specified volume of liquid mix, or the decrease in weight of the same volume of frozen mix as compared to liquid mix.

It is an object of this invention to provide apparatus for manufacturing soft ice cream and dispensing the frozen product intermittently, which apparatus is of simple, economical construction that may be operated by an unskilled person and in which mix is pumped from a receptacle, is aerated a predetermined amount, and passes to a freezer, the mix being directed through a fixed by-pass when the freezer is full, thereby producing an ice cream product of consistent overrun.

Other objects are to provide apparatus of the character described, in which the amount of air introduced into the mix is predetermined at the time of manufacture by selective use of air inlet tubes of different diameters, the particular tube employed being dependent upon the overrun desired; to provide apparatus including check means in the feed line between the mix receptacle and freezer to positively prevent return of aerated mix in the feed line; and to provide apparatus including check means in the by-pass line which is automatically operable to recirculate the mix through the pump when the freezer is full.

Other objects will be manifest from the following description of the present preferred form of the invention, taken in connection with the accompanying drawings, wherein:

FIG. 1 is a front elevational view of the apparatus for use in the manufacture of ice cream, constructed in accordance with the present invention, portions of conventional parts being shown fragmentarily;

FIG. 2 is a sectional view taken along line 2—2 of FIG. 5 looking in the direction of the arrows;

FIG. 3 is an enlarged sectional view taken along line 3—3 of FIG. 1, looking in the direction of the arrows, and showing to advantage the air inlet assembly forming a part of the present invention;

FIG. 4 is a sectional view taken along line 4—4 of FIG. 3, looking in the direction of the arrows;

FIG. 5 is a side elevational view of the apparatus of the present invention, portions of which are broken away to disclose details of construction, for feeding mix to a freezer;

FIG. 6 is a view similar to FIG. 5, illustrating the recirculation of mix through the pump when the freezer is full;

FIG. 7 is an enlarged sectional view of a modified form of air control assembly; and FIG. 8 is an enlarged sectional view of another modification.

Referring now in greater detail to the drawings, there is illustrated a freezing machine 10 of a conventional type employed in retail outlets for dispensing ice cream intermittently, as needed. Mix is fed to the freezing machine through a line 11 from a mix receptacle 12, the mix being indicated at 13. In accordance with the present invention, there is provided a suctioning assembly 14 which is adapted to be inserted in feed line 11 intermediate freezer 10 and mix receptacle 12. Assembly 14 is mounted on a bracket support 15 connected to freezer 10, on which support is a motor 16 for energizing a gear pump which is secured to the motor by suitable means 18. As shown in FIG. 2, pump 17 includes meshing gears and a removable face plate 20 secured in position by members 21.

In conntction with pump 17, there is provided a cylindrical, vertically disposed tubular housing 22 having a bore 23 of uniform diameter throughout. (See FIGS. 5 and 6.) Bore 23 is adapted to receive an upper cylindrical insert 24, the outer diameter of which is substantially the same as bore 23, which insert extends an appreciable distance into tubular member 22. A shoulder 25 of insert 24 abuts the end terminal of member 22 to positively position the insert. Sealling rings are indicated at 26. Insert 24 is reduced in diameter and extended appreciably beyond shoulder 25 as indicated at 27 to form a nipple adapted for engagement with feed line 11. A longitudinal bore 28 of uniform diameter is coextensive with insert 24 and extension 27 for communication between bore 23 and the upper portion of feed line 11. Portions of the walls of insert 24 and tubular member 22 are bored out at 29 for allowing communication between the discharge side of pump 17 and bore 28 by means of connecting line 30. It is further within the contemplation of the present invention to make the lower face of insert 24 concave at the locus of bore 28, as indicated at 31, to provide a ball valve seat.

Assembly 14 of the present invention further includes a lower insert 32 of substantially the same diameter as bore 23, which insert is adapted to be positioned in the bore, the inner terminal of which insert is in spaced relation to insert 24. An abutment shoulder limiting the extent of entry of insert 32 into bore 23 is indicated at 33. Sealing rings are designated 34. Insert 32 is extended beyond shoulder 33 but is of reduced diameter, as indicated at 35. Extension 35 issues into another extension 36 of still further decreased diameter, said latter extension forming a nipple for the reception of the lower portion of feed line 11. Insert 32 is provided with a bore 37 in communication with bore 23, the inner wall of insert 32 being beveled at a point intermediate the length of the insert, as indicated at 38, to provide a ball valve seat. Below beveled portion 38 is a passageway 39 of smaller diameter than bore 37, the walls of which are beveled inwardly at 40 near the lower extremity of extension 35 to provide another ball valve seat. A bore 41 of smaller diameter than passageway 39 extends longitudinally through extension 36 and is in communication with the lower portion of feed line 11. It is further noted that a portion of the wall of tubular member 22 is bored out at 42 to provide communication between bore 23 and the suction side of pump 17 by means of a connecting feed line 43. 44 designates a substantially U-shaped spring clip, the terminals of which are engageable with the shoulder portions 25 and 33 of inserts 24 and 32.

In accordance with the present invention, there is provided a ball valve 45 located within bore 23 and normally lying in the seat-formed concave portion 31 of insert 24. Maintenance of the ball in its normal operative position is effected by means of a convolute spring 46, which is seated on the upper terminal of insert 32 and spirals upwardly through bore 23 a predetermined distance into supporting engagement with ball 45. Additionally, there is provided a ball 47 located in bore 37 and adapted to be seated on the beveled internal wall of insert 32 when mix is not being suctioned to the freezer, as shown in FIG. 6. Similarly, there is provided a ball 48 within bore 39 which is seated on the beveled wall 40 of extension 35 when mix is not being suctioned, also as indicated in FIG. 6.

Extension 35 is provided with an air inlet tube 49 which is adapted for connection with an air control assembly 50 forming a part of the present invention. As shown in FIG. 3, assembly 50 includes a housing 51 of cylindrical shape closed at one end. An air tube 52 extends from a point within housing 51 to a point substantially beyond the housing to facilitate engagement with the upper end of a flexible air tube 53, the lower end of which flexible tube is engaged with air inlet tube 49. A collar 54 is positioned between the outer walls of air tube 52 and the inner walls of cylindrical housing 51 to provide an airtight seal. Assembly 50 further includes an air metering tube 55 of substantially smaller diameter than air tube 52, which metering tube is in communication with tube 52 by passing the former through a stopper or the like 56, which is placed in the upper end of tube 52. An air inlet opening 57 located in the wall of housing 51 admits air for passage through tubes 55, 52, 53 and 49 to bore 39 of assembly 14, where it is mingled with the mix as it passes upwardly toward freezer 10. Air metering tube 55 may be of any predetermined diameter for admitting pre-set quantities of air into assembly 14 in order to obtain a product of invariable overrun.

In use, pump 17 is actuated to draw mix 13 from receptacle 12 through the lower portion of feed line 11 into assembly 14. The force of the mix moving upwardly unseats ball valves 48 and 47 and, as the mix passes air inlet tube 49, it is aerated a predetermined amount. As shown in FIG. 5, the mix then passes through connecting feed line 43 to the suction side of the pump and thence from the discharge side of the pump through connecting feed line 30 and bore 29 to bore 28, where it passes into the upper portion of fed line 11 and into freezer 10.

When freezer 10 is full, the direction of force of the mix in the upper part of feed line 11 is reversed and this force, acting upon ball valve 45, unseats the latter against the tension of spring 46, thereby permitting mix being fed from the discharge side of the pump through connecting line 30 into bore 28 to be recirculated back to the suction side of the pump, which recirculation continues until additional mix is admitted to the freezer, at which time the mix again flows upwardly toward the freezer and ball valve 45 reseats itself automatically under the force of spring 46.

During the recirculation of mix when the freezer is full, ball valves 47 and 48 automatically seat themselves under the downward force of the mix in conjunction with the force of gravity. This seals off that portion of the assembly in which the mix is aerated so that the aerated, or partially aerated, mix will not flow back to receptacle 12 and will not be forced into portions of the air control assembly.

In FIG. 7, there is shown a modified form of the air control assembly illustrated in FIG. 3. The modified assembly includes a cylindrical housing 58 closed at one end. Air inlet openings 59 extend through the wall of the housing into communication with the central bore of the housing, which openings are of a predetermined size. The wall thickness of housing 58 is decreased near its open end to provide an internal beveled shoulder 60 which limits the degree of entry of an air tube 61 into the housing. The open terminal of housing 58 is provided with a well 62 at the locus of air tube 61, which well is adapted to receive a suitable bonding means such as epoxy, designated 63. This retains air tube 61 in operative engagement with housing 58. If desired, epoxy or any other bonding agent may be applied to the outer surface of air tube 61 for adhering the latter to the internal wall of housing 58. The wall at the housing end of air tube 61 is reduced in thickness and provided with a beveled shoulder 64, which portion of the air tube is adapted to receive a metering tube plug 65 having beveled terminals 66, one of which is adapted to engage the complemental beveled shoulder 64 of air tube 61 to limit the entry of plug 65 into the air tube. Any suitable bonding means may be inserted between the outer periphery of plug 65 and the internal wall of air tube 61. Plug 65 is provided with a central, longitudinal bore through which an air metering tube 67 passes. Terminals of plug 65 at the locus of the air metering tube are provided with wells 68 adapted to receive epoxy or other suitable bonding means 69. Air tube 67 may be of any desired diameter, depending on the amount of air to be fed from the interior of housing 58 through air tube 61 to the flexible air tube.

In FIG. 8 there is illustrated still another modified form of air control assembly. In this form there is provided a cylindrical housing 58' and air tube 61' which are similar in construction to housing 58 and air tube 61, shown in FIG. 7, like parts being identified by like prime numbers. The air control orifice is adapted for insertion into the open end of housing 58' which includes a cylindrical housing 70, one end of which is open and the other end of which is provided with a longitudinal opening 71 of predetermined size to provide a communicating passage between the bore of housing 70 and the bore of housing 58'. The terminal of housing 70 is beveled at its upper end, as indicated at 72, for mating engagement with beveled shoulder 64' of air tube 61'. Retention of the air control orifice in air tube 61' may be effected by means of a suitable bonding means. The opposite terminal of housing 70 is also beveled as indicated at 73, which permits the accumulation of foreign particles or moisture within housing 58' without locking opening 71.

By using the air control assemblies here shown and described, and modifying the component parts thereof, the range of overrun percentage will be from approximately two percent up to one hundred percent, or more. Pump performance, vacuum created by the pump, pressure delivered by the pump, and viscosity and temperature of the mix are factors which influence the selection of orifice sizes used for a desired percentage of overrun.

The apparatus of the present invention affords a simple, yet effective, means of producing a constant overrun in an intermittently operated freezer, by use of a minimum of parts. Overrun is controlled by pre-setting the pump by-pass and air control assembly at the time of manufacture. In this connection, it is pointed out that the amount of air mingled with the mix is controlled by the diameter of the air metering tube. If desired, the size of the air opening in the cylindrical housing may be varied also. Consequently, no adjustments are necessary to set up the apparatus, with the result that an unskilled person is capable of effecting operation thereof.

While there has been herein shown and described a presently preferred form of the present invention, it is to be understood that such has been done for purposes of illustration only, and that various changes may be made therein within the scope of the claims hereto appended.

What is claimed is:

1. Apparatus for use in the manufacture of soft ice cream, adapted for insertion between a freezing machine and a mix receptacle, said apparatus including a feed line connecting the mix receptacle to the freezing machine, a pump connected to said feed line for creating suction in the latter, the pump including a suction line and discharge line connected to said feed line in vertically spaced relationship, a ball valve in said feed line between said suction line and discharge line, a convoluted spring in said feed line between said suction line and discharge line, said ball valve being seated in the upper portion of said convoluted spring, to normally prevent passage of the mix from the discharge side to the suction side of the pump, said ball valve being moved to an inoperative position under force of the mix, when the freezing machine is full, an air inlet line, one end of which is connected to said feed line between said pump and mix receptacle, for drawing in air, a closed cylindrical housing connected to the opposite end of said air inlet line, said housing being provided with an air inlet opening in communication with the interior thereof, a separate air conduit unit positioned within said cylindrical housing, the air conduit unit being provided with an air opening of predetermined size for metering air delivered to the air inlet line, and spaced ball valves located in said feed line above and below the air inlet line, to seal off the latter from said feed line when the mix is not being suctioned into the freezing machine.

2. The apparatus of claim 1 wherein said separate air conduit unit comprises an air tube extending from the interior of the cylindrical housing into engagement with said air inlet line, plug means in the terminal of said air tube within said housing, said plug means having a longitudinal bore for permitting passage of air from said housing to said air tube.

3. The apparatus of claim 2 with the addition of an air metering tube of predetermined diameter extending through the longitudinal bore of said plug means to permit passage of a predetermined volume of air from said housing into said air tube.

4. The apparatus of claim 1 wherein said air conduit unit includes a second cylindrical housing, within said first housing and fitted in a terminal of said air tube, one end of said second cylindrical housing being open and the other end of which is provided with a longitudinal opening of predetermined size to provide a communicating passage between the bores of said first and second housings.

References Cited by the Examiner
UNITED STATES PATENTS

| | | | |
|---|---|---|---|
| 1,154,868 | 9/15 | McHenry | 259—95 |
| 2,067,683 | 1/37 | Routh | 62—131 |
| 2,211,387 | 8/40 | Routh | 62—342 |
| 2,219,656 | 10/40 | Miller | 62—342 |
| 2,415,992 | 2/47 | Clair | 138—40 |
| 2,560,664 | 7/51 | Sammy | 62—342 |
| 2,700,873 | 2/55 | Carlson | 103—44 |
| 2,797,164 | 6/57 | McGowan et al. | 99—244 |
| 2,827,773 | 3/58 | Detjen | 62—135 |
| 2,981,075 | 4/61 | Duke et al. | 62—392 |
| 3,015,218 | 1/62 | Wakeman | 62—342 |
| 3,018,641 | 1/62 | Carpigiani | 62—342 |
| 3,051,456 | 8/62 | Clarke et al. | 62—342 |

ROBERT A. O'LEARY, *Primary Examiner.*

MEYER PERLIN, *Examiner.*